United States Patent [19]

Wagner

[11] Patent Number: 5,014,458
[45] Date of Patent: May 14, 1991

[54] FISHING POLE HOLDER

[76] Inventor: Larry C. Wagner, 321 Manor Rd., Steele, Mo. 63877

[21] Appl. No.: 523,476

[22] Filed: May 15, 1990

[51] Int. Cl.$^5$ .............................................. A01K 97/10
[52] U.S. Cl. .................................................. 43/21.2
[58] Field of Search ................ 43/21.2; 248/512, 514, 248/519, 520, 534, 538

[56] References Cited

U.S. PATENT DOCUMENTS

| | | | |
|---|---|---|---|
| 3,063,668 | 11/1962 | Yohe | 43/21.2 |
| 3,385,544 | 5/1968 | Barnett | 43/21.2 |
| 3,444,643 | 5/1969 | Dobbs | 43/17 |
| 3,564,753 | 2/1971 | Fravel | 43/21.2 |
| 3,870,259 | 3/1975 | Reynolds | 43/21.2 |
| 4,157,803 | 6/1979 | Mack | 248/512 |
| 4,541,196 | 9/1985 | Jershin | 43/17 |
| 4,640,038 | 2/1987 | Jershin | 43/21.2 |
| 4,753,029 | 6/1988 | Shaw et al. | 43/21.2 |
| 4,823,723 | 4/1989 | Brooks | 114/343 |

Primary Examiner—Kurt Rowan
Attorney, Agent, or Firm—Walker & McKenzie

[57] ABSTRACT

A fishing pole holder for holding a fishing pole to a boat. The fishing pole holder includes base structure for being fixedly and permanently attached to the boat; body structure for being slidably and removably attached to the base structure; and fishing pole holder structure for being attached to the body structure and for holding the fishing pole to the body structure.

3 Claims, 1 Drawing Sheet

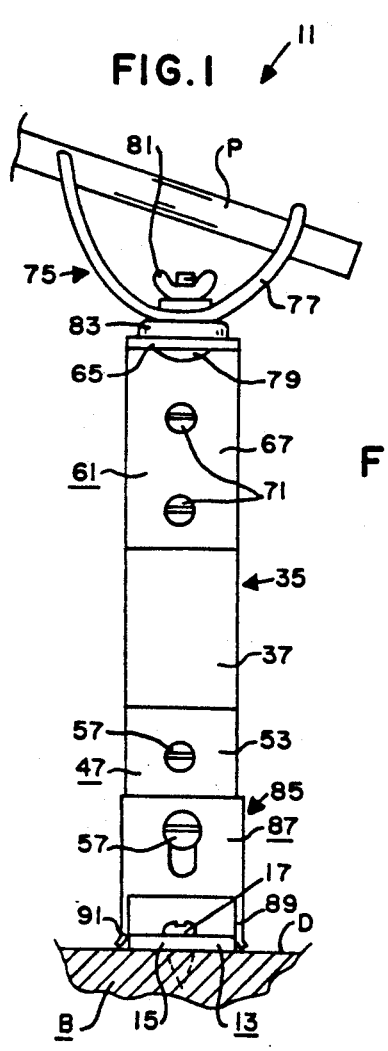
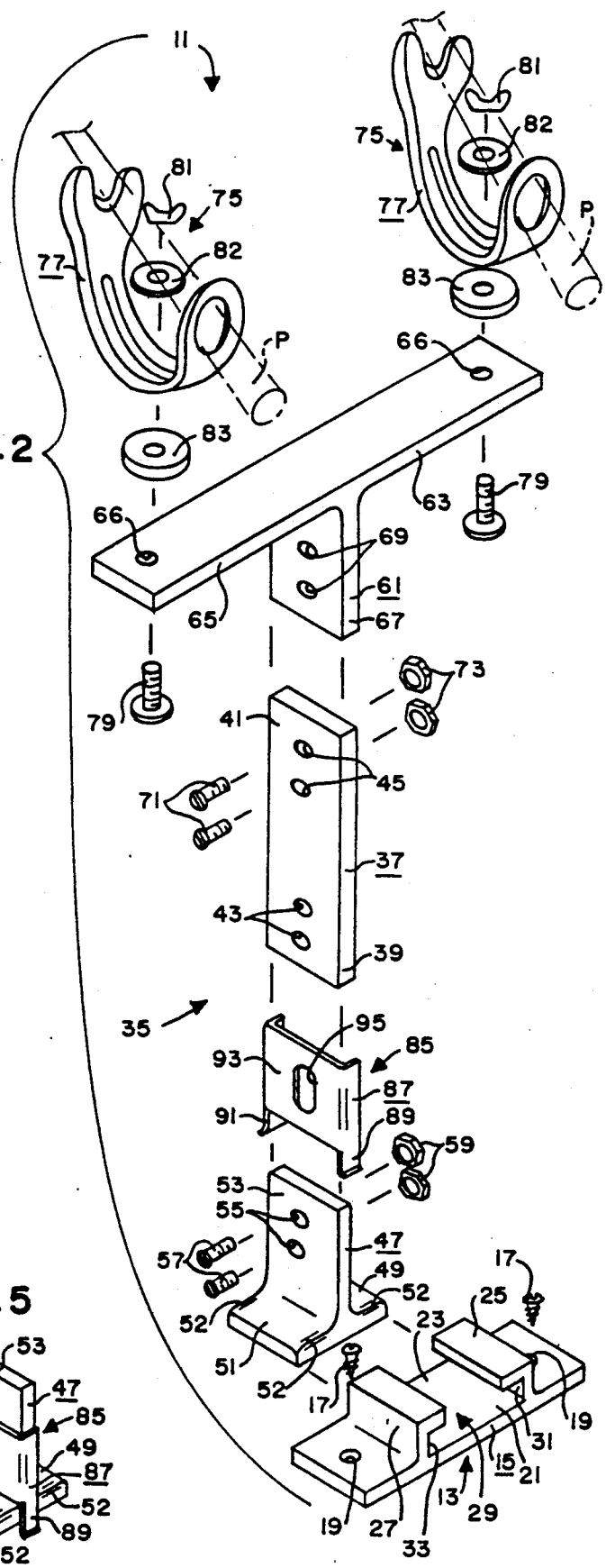
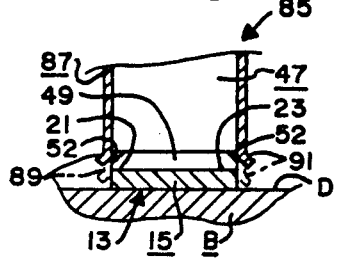
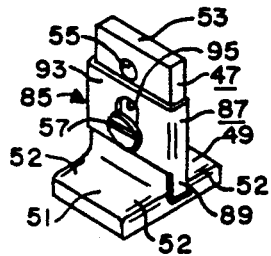
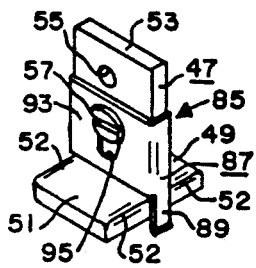

FISHING POLE HOLDER

BACKGROUND OF THE INVENTION

1. Field of the Invention

The present invention relates, in general, to a device for being mounted to a boat or the like and for holding one or more fishing poles.

2. Information Disclosure Statement

A preliminary patentability search in class 43, subclass 21.2, and class 248, subclasses 512, 514, and 538, disclosed the following patents: Dobbs, U.S. Pat. No. 3,444,643; Mack, U.S. Pat. No. 4,157,803; Jershin, U.S. Pat. No. 4,541,196; Shaw et al., U.S. Pat. No. 4,753,029; and Brooks, U.S. Pat. No. 4,823,723. Each of the above patents disclose structures for supporting fishing rods or poles and, thus, appear to relate to the present invention. However, none of the above patents disclose or suggest the present invention. More specifically, none of the above patents disclose or suggest a fishing pole holder including base means for being fixedly and permanently attached to a boat; body means for being slidably and removably attached to said base means; and fishing pole holder means for being attached to said body means and for holding a fishing pole to said body means.

SUMMARY OF THE INVENTION

The present invention is directed toward providing an improved fishing rod or pole holder. The concept of the present invention is to provide a safe fishing pole holder that can be installed at any location in a boat, that can be quickly and easily dismantled to allow safe and easy ingress and egress, that can be stored in a safe manner and in a small storage space, that can be quickly and easily set up, that can be easily adjusted in height and pole angle, and that can be constructed out of a weather-resistant material.

The fishing pole holder of the present invention includes, in general, base means for being fixedly and permanently attached to the floor or deck of a boat, body means for being slidably and removably attached to the base means, and fishing pole holder means for being attached to the upper end of the body means for holding one or more fishing poles.

BRIEF DESCRIPTION OF THE DRAWINGS

FIG. 1 is a side elevational view of the fishing pole holder of the present invention in combination with a boat and a fishing pole.

FIG. 2 is an exploded perspective view of the fishing pole holder of the present invention in combination with a pair of fishing poles shown in broken lines.

FIG. 3 is a sectional view of a portion of the fishing pole holder of the present invention in combination with a boat and with a portion thereof in a moved position in broken lines.

FIG. 4 is a perspective view of a portion of the fishing pole holder of the present invention.

FIG. 5 is a perspective view similar to FIG. 4, but with a portion thereof in a moved position.

DESCRIPTION OF THE PREFERRED EMBODIMENT

The fishing pole holder 11 of the present invention is used in combination with a boat B and a fishing pole P (or a plurality of fishing poles P) for holding the fishing pole P to the boat B. More specifically, the boat B includes a deck D and the fishing pole holder 11 is mounted on the deck D for holding one or more fishing poles P a spaced distance above the deck D. It should be noted that the term "deck" is used here in a generic sense to include the typical floor, bench seats, gunwales, etc., as will now be apparent to those skilled in the art.

The fishing pole holder 11 includes base means 13 for being fixedly and permanently attached to the boat B. Preferably, the base means 13 includes an elongated plate member 15 for being fixedly attached to the deck D of the boat B by screws 17 or the like. Thus, the plate member 15 preferably has an aperture 19 therethrough adjacent each end thereof for allowing a screw 17 to pass therethrough and fixedly anchor the plate member 15 to the deck D of the boat B as will now be apparent to those skilled in the art. The plate member 15 has a first side 21 and a second side 23. The base means 13 includes spaced first and second track members 25, 27 extending transversely across the plate member 15 between the first and second sides 21, 23. The space between the first and second track members 25, 27 form a channel 29. The upper ends of the first and second track members 25, 27 are bent toward the opposite track member 25, 27 to form first and second grooves 31, 33 respectively, for reasons which will hereinafter become apparent. The base means 13 may be constructed out of various specific materials and in various specific methods as will now be apparent to those skilled in the art. Preferably, the base means 13 is machined out of aluminum.

The fishing pole holder 11 includes body means 35 for being slidably and removably attached to the base means 13. The body means 35 preferably includes a trunk member 37 having a lower end 39 and an upper end 41. The trunk member 37 preferably consists of an elongated bar of aluminum or the like having a pair of apertures 43 through the lower end 39 and a pair of apertures 45 through the upper end 41 for reasons which will hereinafter become apparent. It should be noted that the fishing pole holder 11 may include trunk members of different lengths to allow the overall height of the fishing pole holder 11 to be varied as will now be apparent to those skilled in the art. Further, two or more identical trunk members can be secured to one another to thereby increase the effective length thereof.

The body means 35 preferably includes a foot member 47 for being attached to the lower end 39 of the trunk member 37. The foot member 47 preferably includes a first flange 49 for slidably extending into the first groove 31 of the channel 29 of the base means 13 and a second flange 51 for slidably extending into the second groove 33 of the channel 29 of the base means 13. The upper edges of the leading and trailing sides of each flange 49, 51 are preferably beveled as at 52 to allow easy insertion thereof into the channel 29 as will now be apparent to those skilled in the art. The foot member 47 preferably includes a leg portion 53 extending generally upward from the flanges 49, 51 for allowing the foot member 47 to be securely attached to the lower end 39 of the trunk member 37. The leg portion 53 preferably has a pair of apertures 55 therethrough. A pair of bolts 57 are preferably provided for extending through the apertures 43 through the lower end 39 of the trunk member 37 and through the apertures 55 through the leg portion 53 of the foot member 47. The lower bolt 57 is preferably a shoulder bolt for reasons which will hereinafter become apparent. A pair of nuts 59 are preferably provided to removably secure the bolts 57 in place and thereby removably attach the foot member 47 to the lower end 39 of the trunk member 37. The foot member 47 may be manufactured in various manners and out of various materials as will now be apparent to those skilled in the art. Preferably, the foot member 47 is machined out of aluminum or the like in a size to fit the channel 29 of the base means 13 and the lower end 39 of the trunk member 37.

The body means 35 preferably includes a head member 61 for being attached to the upper end 41 of the trunk member 37. The head member 61 preferably includes a first arm portion 63 and a second arm portion 65. An aperture 66 is preferably provided through the outer end of each arm portion 63, 65 for reasons which will hereinafter become apparent. The head member 61 preferably includes a neck portion 67 extending generally downward from the inner end of each arm portion 63, 65 for allowing the head member 61 to be securely attached to the upper end 41 of the trunk member 37. The neck portion 67 preferably has a pair of apertures 69 therethrough. A pair of bolts 71 are preferably provided for extending through the apertures 45 through the upper end 41 of the trunk member 37 and through the apertures 69 through the neck portion 67. A pair of nuts 73 is preferably provided to removably secure the bolts 71 in place and thereby removably attach the head member 61 to the upper end 41 of the trunk member 37. The head member 61 may be manufactured in various manners and out of various materials as will now be apparent to those skilled in the art. Preferably, the head member 61 is machined out of aluminum or the like in a size to fit the upper end 41 of the trunk member 37.

The fishing pole holder 11 preferably includes at least one and preferably a pair of fishing pole holder means 75 for being attached to the body means 35 and for holding at least one and preferably a pair of fishing poles P to the body means 35. More specifically, the fishing pole holder 11 preferably includes a first fishing pole holder means 75 for being removably and adjustably attached to the first arm portion 63 of the head member 61 and a second fishing pole holder means 75 for being removably and adjustably attached to the second arm portion 65 of the head member 61. Each fishing pole holder means 75 may consist of a typical, off-the-shelf type fishing pole holder means well known to those skilled in the art for being attached to the gunwale of a boat or the like by adjustable C-clamps or the like. Thus, each fishing pole holder means 75 preferably includes a generally U-shaped bracket 77 adapted to securely receive the butt end of a fishing pole P as will now be apparent to those skilled in the art. A bolt 79 is preferably provided for extending through each of the apertures 66 through the arm portions 63, 65 of the head member 61 and through an aperture or slot in each U-shaped bracket 77. A wing nut 81, or the like, and a washer 82 are preferably provided to removably secure each bolt 79 in place and thereby removably and adjustably attach each fishing pole holder 75 to the head member 61. A washer 83 is preferably provided between each U-shaped bracket 77 and the arm portions 63, 65 to make the attachment therebetween more secure as will now be apparent to those skilled in the art.

The fishing pole holder 11 preferably includes lock means 85 for locking the body means 35 to the base means 13. The lock means 85 preferably includes a slide member 87 attached to the leg portion 53 of the foot member 47 of the body means 35 for movement between a first position as shown in solid lines in FIGS. 3 and 4 in which the body means 35 can be removed from the base means 13 and a second position as shown in solid lines in FIGS. 1 and 5 and in broken lines in FIGS. 3 and 4 in which the body means 35 is locked to the base means 13. The slide member 87 preferably includes a first finger member 89 for engaging the first side 21 of the plate member 15 of the base means 13 when the slide member 87 is in the second position and preferably includes a second finger member 91 for engaging the second side 23 of the plate member 15 of the base means 13 when the slide member 87 is in the second position. The slide member 87 preferably includes a bridge portion 93 extending between the finger members 89, 91. The bridge portion 93 preferably has an elongated slot 95 therethrough. One of the bolts 57 (e.g., the lower bolt 57) preferably extends through the slot 95 to slidably secure the slide member 87 to the leg portion 53 of the foot member 47 in a manner as will now be apparent to those skilled in the art. This lower bolt 57 is preferably a shoulder bolt to create a space between the side of the foot member 47 and the head of the bolt 57 for the slide member 87 to freely slide in as will now be apparent to those skilled in the art. The lower ends of the finger members 89, 91 may be angled outward as clearly shown in FIGS. 1 and 3 for ease of operation. The slide member 87 may be manufactured in various manners and out of various materials as will now be apparent to those skilled in the art. Preferably, the slide member 87 is bent and machined or otherwise formed out of stainless steel or the like in a size to fit the leg portion 53 of the foot member 47. By constructing the slide member 87 out of stainless steel, it will have sufficient strength to lock the body means 35 to the base means 13 and sufficient weight to cause the slide member 87 to normally fall to the second position due to the force of gravity as will now be apparent to those skilled in the art.

The use of the fishing pole holder 11 is quite simple. First, the base means 13 is secured to the deck D of the boat B at any desired location. The base means 13 is substantially flat and will not adversely affect ingress into and egress from the boat B. The trunk means 37, foot member 47, head member 61, fishing pole holder means 75, and slide member 87 are assembled using the various nuts and bolts as will now be apparent to those skilled in the art. To secure the body means 35 to the base means 13, the slide member 87 is manually moved to the up position and the foot member 47 slid into the channel 29. The slide member 87 is then released and gravity will then cause the slide member 87 to move to the down position to lock the body means 35 to the base means 13. One or more fishing poles P can then be attached to the fishing pole holder means 75 in a manner now apparent to those skilled in the art.

Although the present invention has been described and illustrated with respect to a preferred embodiment and a preferred use therefore, it is not to be so limited since modifications and changes can be made therein which are within the full intended scope of the invention.

I claim:

1. The combination with a boat and a fishing pole of a fishing pole holder for holding said fishing pole to said boat; said fishing pole holder comprising:
(a) base means for being fixedly and permanently attached to said boat; said base means having a channel; said channel having opposing first and second grooves; said base means including a bottom plate member having a first side and a second side;

(b) body means for being slidably and removably attached to said base means and for being for slidably received by said channel of said base means; said body means including a trunk member having a lower end and an upper end, a foot member attached to said lower end of said trunk member, and a head member attached to said upper end of said trunk member; said foot member of said body means including a first flange for slidably extending into said first groove of said channel of said base means and including a second flange for slidably extending into said second groove of said channel of said base means;

(c) fishing pole holder means for being attached to said body means and for holding said fishing pole to said body means; and (d) lock means for locking said body means to said base means; said lock means including a slide member attached to said body means for movement between a first position in which said body means can be removed from said base means and a second position in which said body means is locked to said base means; said slide member including a first finger member for engaging said first side of said bottom plate member of said base means when said slide member is in said second position and including a second finger member for engaging said second side of said bottom plate member of said base means when said slide member is in said second position.

2. The fishing pole holder of claim 1 in which said head member of said body means has a first end and a second end; and in which said fishing pole holder means includes a first fishing pole holder member for being movably attached to said first end of said head member of said body means and including a second fishing pole holder member for being movably attached to said second end of said head member of said body means.

3. The combination with a pair of fishing poles and boat having a floor, of a fishing pole holder for holding said fishing poles to said boat; said fishing pole holder comprising:

(a) base means for being fixedly and permanently attached to said floor of said boat; said base means having a channel therein; said channel of said base means having opposing first and second grooves; said base means including a bottom plate member having a first side and a second side;

(b) body means for being slidably and removably attached to said base means and for being for slidably received by said body means; said body means including a trunk member having a lower end and an upper end, a foot member attached to said lower end of said trunk member, and a head member attached to said upper end of said trunk member; said foot member of said body means including a first flange for slidably extending into said first groove of said channel of said base means and a second flange for slidably extending into said second groove of said channel of said base means; said head member of said body means having a first end and a second end; and (c) fishing pole holder means for being attached to said body means and for holding said fishing pole to said body means; said fishing pole holder means including a first fishing pole holder member for being movably attached to said first end of said head member of said body means and including a second fishing pole holder member for being movably attached to said second end of said head member of said body means; and (d) lock means for locking said body means to said base means; said lock means including a slide member attached to said body means for movement between a first position in which said body means can be removed from said base means and a second position in which said body means is locked to said base means; said slide member including a first finger member for engaging said first side of said bottom plate member of said base means when said slide member is in said second position and including a second finger member for engaging said second side of said bottom plate member of said base means when said slide member is in said second position.

* * * * *